United States Patent Office 3,234,156

Patented Feb. 8, 1966

3,234,156

LIQUID POLYMERIC PRINTING PLATE COMPOSITIONS COMPRISING A VINYL CHLORIDE POLYMER, A 2-IMIDAZOLINE AND A POLYESTERAMINE CONTAINING REACTION MIXTURE

Melvin Nimoy, Hyde Park, Philip K. Isaacs, Brookline, Norman G. Tompkins, Melrose, and Russell L. Haden, Jr., Lincoln, Mass., assignors to W. R. Grace & Co., Cambridge, Mass., a corporation of Connecticut No Drawing. Filed May 24, 1961, Ser. No. 112,212

11 Claims. (Cl. 260—22)

This invention relates to printing plates and more particularly to duplicate plates suitable for use in letterpress printing. In a specific aspect, it relates to thermosetting liquid polymeric compositions which are moldable into flexible plastic plates having a degree of hardness suitable for printing on corrugated boxes and cartons.

The variety of printing operations and the desired reproductive quality require, inter alia, diverse types of printing plates. The selection of a specific type is dependent upon such factors as simplicity or complexity of plate preparation, quality and quantity of printed reproductions, the economics of plate preparation and the specific printing operation. The most desirable plate is one which could be prepared quickly, economically, and give reproductions of a high caliber and at a rapid rate. There is no type of printing plate known which singularly fulfills all printing operations. Each type of plate must be tailored to meet specific printing needs.

The operation of printing on cartons or boxes having walls of corrugated fiberboard disposed between smooth-surfaced paperboard requires a special type of plate. The letters and characters on such plates lie in relief and are normally thicker and raised higher than the faces of plates used in other letterpress printing operations. A prime requisite of such plates is that the printing surface must be sufficiently firm to effect a faithful transfer, and yet possess a certain degree of resiliency so as not to crush the corrugated walls of the container when the impression is made.

The box plates now in use are generally fabricated from sheets of uncured rubber which vulcanize during the molding operation. The use of solid sheets, however, does not always assure fidelity of reproduction because the sheeted material does not readily fill the minute depressions of the mold. Consequently, the printing features of the resulting plate are not as sharp as the original form. In addition, the uncured sheets must be stored under refrigeration to avoid partial curing at room temperature. Such curing introduces molding difficulties.

It is, therefore, an object of this invention to provide plastic plates which are adaptable for use in printing on corrugated containers. It is another object of this invention to provide liquid, thermosetting polymeric compositions from which cured, flexible letterpress printing plates may be molded.

Briefly stated, this invention comprises compositions of matter which include a halogen-containing polymeric material, a polyesteramine-containing reaction mixture derived by a step-wise reaction of dicarboxylic acids, glycols and amines, and an imidazoline crosslinking agent. The resulting printing plate compositions are thick, flowable liquids, stable at room temperature, which cure rapidly under heat during the press molding operation to form flexible printing plates of excellent quality. Curing is generally effected in about 2 to 10 minutes at about 155° C. to 168° C. The flexibility of the cured plates permits their use on either flatbed or rotary letterpresses. Certain additives, such as moisture-sequestering agents, may be incorporated in the liquid compositions to improve their performance during the molding step and to inhibit formation of bubbles in the plate.

POLYMERIC MATERIALS

The halogen-containing polymeric materials which are operable in the compositions of this invention include suspension, emulsion, and paste grade homopolymers of vinyl chloride; vinyl chloride copolymerized with another polymerizable monomer, such as vinyl acetate, vinylidene chloride, dibutyl maleate, vinyl laurate, and a host of other polymerizable vinyl esters; and homopolymers and copolymers of vinylidene chloride.

REACTION PRODUCTS CONTAINING POLYESTERAMINES

The polyesteramine-containing reaction mixtures are derived in a two-step process which is comprehensively disclosed in U.S. patent application Serial No. 112,210, filed May 24, 1961. In the first step, a glycol and a dicarboxylic acid, and preferably in amounts of 0.75 to one mole of the glycol and one mole of the dicarboxylic acid, are contacted under reactive conditions suitable to promote esterification. The water of reaction is continuously removed as it is formed to displace the chemical equilibrium. The first step of the reaction is halted when less than all and preferably when between about 70 percent to 90 percent of the carboxylic groups are consumed. This gives a mixture of products comprised principally of an idealized polyester having a molecular weight of about 500–2900, plus a minor amount of various species of products. In the second step, the resulting mixture is then contacted under reactive conditions with an amount of a suitable amine sufficient to react with the residual 30 percent to 10 percent of the carboxylic groups in the mixture. The water is continuously removed and the reaction is taken to completion. This is determined when the flow of distillate ceases. The resulting product is comprised principally of an idealized polyesteramine having a molecular weight of about 600–3000 in admixture with a minor amount of various species products.

Suitable acids are the saturated straight chain aliphatic dicarboxylic acids containing 3 to 10 carbon atoms, such as malonic, succinic, glutaric, adipic, pimelic, suberic, azelaic and sebacic acids. Appropriate glycols are those containing 2 to 10 carbon atoms, such as ethylene glycol, diethylene glycol, triethylene glycol, 1,2-propanediol, 1,3-propanediol, 1,6-hexanediol, and neopentyl glycol.

The reaction is preferably carried out in the presence of a small amount of an esterification catalyst, and generally between about 0.1 percent to 0.5 percent, based on the weight of the acid, is sufficient. Effective catalysts include, among others, sulfuric, hydrochloric, and p-toluenesulfonic acids. In addition, an agent may be added to the mixture to chelate and inactivate any metal impurities which may be present in the glycol and acid. These impurities are of such small order that generally between about 0.1 percent to 0.5 percent by weight of the agent, based on the combined weight of the acid and glycol, is sufficient to react with substantially all of such impurities. Suitable agents include the alkali metal polyphosphates, such as sodium and potassium tripolyphosphate.

Esterification is carried out by charging the reactants, catalyst, and the chelating and inactivating agent to an appropriate apparatus and carrying out the reaction under suitable conditions of temperature and pressure. Irrespective of the particular reactive method employed, the water of condensation is continuously removed as formed, and the first step of the reaction is deemed complete solely by the amount of water which is removed from the system. The end point, therefore, is ascertained when between about 70 percent to 90 percent of the carboxylic groups are consumed. Under these conditions, sufficient carboxylic groups remain free for reaction with the subsequently added amine.

While the end point of step one of the reaction is determined by the consumption of carboxylic groups, the constitution of the resulting reaction mixture is dependent upon the amounts of acid and glycol used in the reaction. For example, if equimolar amounts of dicarboxylic acid and glycol are employed, the reaction mixture will be comprised of (1) a major amount of an idealized polyester having a molecular weight of about 500–1500 and terminated with a hydroxyl group on one end and a carboxylic group on the opposite end of the chain, (2) species of esters having molecular weights higher and lower than the idealized compound, (3) products diterminated with carboxylic groups, and (4) products diterminated with hydroxyl groups. On the other hand, if an excess of acid is used, i.e., of the order of about one mole of acid for each 0.75 mole of glycol, and the reaction is carried to a point until all of the glycol is consumed, the resulting mixture will be comprised of (1) a major amount of an idealized polyester having a molecular weight of 500–2900 and terminated on each end with carboxylic groups only, and (2) minor amounts of species of esters diterminated with carboxylic groups having molecular weights higher and lower than the idealized compound.

Step two, covering preparation of the final product, is derived by contacting the resulting mixture of step one under reactive conditions with an amount of an amine sufficient to react with the residual 30 percent to 10 percent of the carboxylic groups in the mixture. The operable amines have the formula $$R—\underset{}{\overset{R'}{\overset{|}{N}}}—R_2—X$$

in which R and R′ are preferably lower alkyl groups having 1 to 4 carbon atoms, $R^2$ is preferably a lower alkylene group having 1 to 4 carbon atoms, and X is a member selected from the group consisting of —OH, —$NH_2$ and —$NHR^3$ where $R^3$ is a lower alkyl group. Suitable amines include 3-diethylaminopropylamine, 2-diethylaminoethylamine, 3-dibutylaminopropylamine, 4-diethylaminobutylamine, 2-dimethylaminoethylamine, and such alkanol amines as 2-diethylaminoethanol and 2-dimethylaminoethanol.

In carrying out the second step of the reaction, the components are thoroughly stirred during amine addition and throughout the reaction period while a nitrogen atmosphere is maintained to insure against introduction of air into the system. When the requisite amount of amine has been added, the temperautre of the mixture rises about 20° C. due to salt formation. Thereafter, the reaction is carried out under conditions suitable to promoting formation of the polyesteramine.

Whatever reactive conditions and apparatus are used, the terminal point of the reaction is determined when substantially all of the residual carboxylic groups in the mixture are consumed. This is ascertained when the flow of distillate ceases. The resulting product is a viscous fluid having a clear light amber color comprised of a mixture of constituents. The constitution of this mixture is dependent upon the molar amounts of acid and glycol used in step one. For example, if equimolar amounts of acid and glycol are employed, then the product of step two will be comprised of (1) a predominant amount of an idealized polyesteramine having a molecular weight of about 600–1600 and terminated on one end with a tertiary amino group and on the other with a hydroxyl group, (2) polyesteramines having higher and lower molecular weights than the idealized compound, (3) products terminated on each end with tertiary amino groups, and (4) products terminated on each end with hydroxyl groups. If an excess of acid is used in step one, the resulting product of step two will be comprised of (1) an idealized polyesteramine having a molecular weight of about 600–3000 and terminated on each end with tertiary amino groups, (2) minor amounts of species of polyesteramines terminated on each end with tertiary amino groups having molecular weights higher and lower than the idealized compound.

The preparation of polyesteramine-containing reaction mixtures is illustrated in Examples I, II and III:

*Example I*

A reaction mixture was prepared in an apparatus comprising a pot equipped with mechanical stirrer, thermometer, nitrogen inlet, and a 3-foot unpacked fractionating column maintained at 100° C. and leading to a condenser and receiver. In the first step, 2,387 grams (22.5 moles) of diethylene glycol were charged to the pot and then 4,234 grams (22.5 moles) of azelaic acid were added with stirring. After all of the acid was added, 4.23 grams of p-toluenesulfonic acid were charged as catalyst, followed by the addition of 6.62 grams of sodium tripolyphosphate. The mixture was deaerated by stirring for 15 minutes at a pressure of 20 mm. Hg under a nitrogen blanket, and then the system was returned to one atmosphere. Both stirring and the nitrogen stream were maintained throughout the reaction period.

The reaction was carried out under a time-temperature-pressure schedule conducive to promoting rapid esterification. This particular schedule, however, is not an absolute criterion for obtaining the desired product, but is illustrative only of one means by which the product may be derived. Since the reaction of step one is purposely an incomplete one, the end point is determined solely by the consumption of carboxylic groups. Therefore, the schedule may be modified with variations in the apparatus.

The following schedule was used in this particular example. In other apparatus, however, more or less time may be required near the end of the reaction in order to distill the requisite amount of water:

| Time, minutes | Temp., ° C. | Pressure, mm. Hg |
|---|---|---|
| 150 | 25–150 | 720 |
| 30 | 150–155 | 700 |
| 30 | 155–165 | 670 |
| 80 | 165–200 | 640 |
| 30 | 200 | 550 |

During the course of the reaction, the water was continuously removed, and the reaction was stopped when 700 ml. were collected. The total amount of water which was removed over the 5⅓-hour period corresponded to about 86 percent consumption of the available carboxylic groups. The reaction gave a mixture of products comprising (1) as the predominant constituent, a polyester having a molecular weight of about 1000 and the following idealized structure:

$$HO—(CH_2)_2—O—(CH_2)_2—O—\left[\overset{O}{\overset{\|}{C}}—(CH_2)_7—\overset{O}{\overset{\|}{C}}—O—(CH_2)_2—O—(CH_2)—O—\right]_3\overset{O}{\overset{\|}{C}}—(CH_2)_7—COOH$$

(Structure I)

(2) species of esters having molecular weights higher and lower than the idealized polyester, (3) products diterminated with carboxylic groups, and (4) products diterminated with hydroxyl groups.

726 grams (5.58 moles) of 3-diethylaminopropylamine were stirred into the foregoing reaction mixture at room temperature and while avoiding the introduction of air.

The exothermic nature of the reaction caused the temperature to rise from 22° C. to 45° C. After all of the amine was added, the components were reacted according to the following schedule. The temperature at the top of the fractionating column was checked frequently to be certain that no amine (B.P., 170° C.) was distilling.

| Time, minutes | Temp., ° C. | Pressure, mm. Hg |
|---|---|---|
| 60 | 45–150 | 760 |
| 60 | 150–200 | 760 |
| 180 | 200–210 | 760 |
| 30 | 210 | 760–600 |
| 30 | 210 | 600–450 |
| 30 | 210 | 450– 30 |

The water of reaction was continuously removed as the reaction progressed, and the reaction was stopped when 141 ml. of distillate were collected over the 6½-hour period. In this case, the 31 ml. of distillate in excess of theoretical was glycol. The product was a clear, light amber liquid having a viscosity of about 2,500 centipoises at 25° C., and was constituted of a mixture comprising (1) as the predominant constituent, a polyesteramine of a molecular weight of about 1100 and having the following idealized structure:

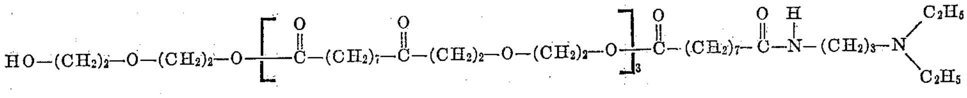

(Structure II)

(2) polyesteramines having lower and higher molecular weights than the idealized structure, (3) species of products diterminated with tertiary amino groups, and (4) species of products diterminated with hydroxyl groups. The dihydroxylated products are inert in the mixture and simply act as plasticizer when the mixture of reaction products is added to a polymeric material, such as polyvinyl chloride.

*Example II*

In this example, the reaction conditions were modified slightly to give substantially the same mixture of reaction products of Example I. A mixing vessel was provided and equipped with mechanical stirrer, nitrogen inlet, thermometer, and a fractionating column maintained at 100° C. which led to a condenser and receptacle.

941 grams (5 moles) of azelaic acid were mixed in the vessel with 530 grams (5 moles) of diethylene glycol in the presence of 0.94 gram of p-toluenesulfonic acid as catalyst. The reaction was carried out in a nitrogen atmosphere and in the absence of vacuum while continuously stirring the reactants. The mixture was heated initially to 115° C. and the temperature was gradually increased to 190° C. over a 4-hour period. At this time, 158 ml. of water were collected, corresponding to 88 percent consumption of the available carboxylic groups, and the reaction was stopped. The resulting reaction product was comprised substantially of the mixtures described in Example I.

161.4 grams (1.24 moles) of 3-diethylaminopropyl amine were added to the reaction mixture and the combined mixture was then reacted in the presence of nitrogen and in the absence of vacuum. It was initially heated to 115° C. and the temperature was then gradually elevated at 220° C. over a 6-hour period while continuously removing the water of reaction. 20 ml. of water were collected at the 6-hour period and the reaction was stopped. This corresponded to substantially complete consumption of the residual carboxylic groups. The final product was a viscous fluid of light amber color and was comprised of the mixtures as described in Example I.

When equimolar amounts of dicarboxylic acid and glycol are employed and the reaction is carried to a point where 70 percent to 90 percent of the carboxyl groups are consumed, the result is a reaction mixture comprising products having as the predominant component a product bearing a hydroxyl and a carboxylic group on opposed ends of the molecular chain. This is illustrated by Structure I, above. When the mixture is contacted with an amount of amine sufficient to react with the residual carboxylic groups, the predominant component resulting therefrom bears a hydroxyl and a tertiary amino group on opposed ends, as illustrated by Structure II.

If an excess of acid is used, i.e., of the order of about one mole of acid for each 0.75, and preferably 0.875, mole of glycol, and the reaction is carried to a point until all of the glycol is consumed, the resulting mixture will be comprised of a predominant ester product diterminated with carboxylic groups. When these carboxylic groups are further reacted with an amine, the predominant product will bear tertiary amino groups on each end of the chain. The use of excess acid to prepare such products is demonstrated in Example III.

*Example III*

The process of this example was carried out in a manner and apparatus as described in Example I. 376 grams (2 moles) of azelaic acid, 133 grams (1.75 moles) of 1,2-propanediol, 0.376 gram of p-toluenesulfonic acid, and 0.509 gram of sodium tripolyphosphate were charged to the mixer and stirred. Agitation was continued and a nitrogen atmosphere was maintained throughout the reaction period. After all reactants were charged, the mixture was heated according to the following schedule and at atmospheric pressure:

| *Time (hours)*: | ° *C.* |
|---|---|
| 3 | 25–170 |
| 2 | 170–190 |
| 2 | 190–210 |
| 1 | 210 |

The water of reaction was continuously removed as formed, and the flow of distillate ceased after 63 ml. were collected. The reaction gave a mixture of products comprised of (1) a major amount of a polyester diterminated with carboxylic groups and assumed to have the following idealized structure:

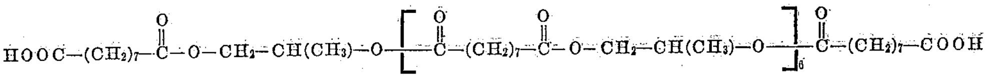

(Structure III)

and (2) minor amounts of species of esters diterminated with carboxylic groups having molecular weights higher and lower than the idealized structure.

65 grams (0.5 mole) of 3-diethylaminopropylamine were then added and the mixture was heated first for 5 hours at 185–200° C. followed by a 2-hour heating period at 200–210° C. Atmospheric pressure was maintained throughout the heating cycle and the water of reaction was removed as formed. The reaction ceased after 9 ml. of distillate were collected, giving a mixture of products comprising (1) a major amount of polyesteramine diterminated with tertiary amino groups having the following idealized structure:

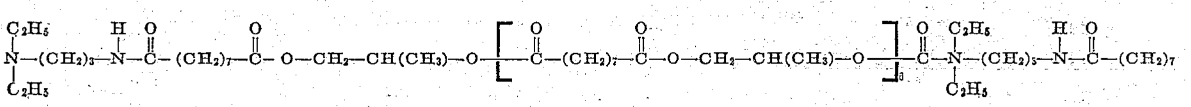

(Structure IV)

and (2) minor amounts of species of polyesteramines diterminated with tertiary amino groups having molecular weights higher and lower than the idealized structure.

When compounded with the polymeric material, the reaction mixtures endow the resin with a desirable degree of flexibility while improving its physical and chemical properties. Upon curing in the presence of an imidazoline, the polyesteramine becomes chemically grafted to the resin through its tertiary nitrogen. This results in a permanently plasticized resin where plasticizer and resin cannot be extracted by oils and aliphatic solvents.

IMIDAZOLINES

Imidazolines are strong organic bases, highly reactive with many reagents, and many possess strong surface activity. The imidazolines which are useful in this invention are 2-substituted-2-imidazoline and 1,2-disubstituted-2-imidazoline, and preferably those which in themselves are non-volatile and chemically stable at curing temperatures. In addition, they should be such that the uncured mixture with the halogen-containing polymer undergoes no change with time. The role of the imidazolines in this invention is two-fold. First, they are effective agents for crosslinking the polymeric chains and, in this capacity, they become grafted to the polymer. Secondly, they enhance partial grafting of the polyesteramine plasticizer to the polymer. This action reduces the tendency of the plasticizer to extractability by oils and aliphatic solvents after cure.

The imidazolines may be prepared by contacting appropriate amounts of polyamines and mono- and/or polycarboxylic acids at reactive temperatures and pressures. The temperature may range between about 150° C. and 240° C. and the operable pressure may range between about .1 mm. and 760 mm. Hg. Suitable polyamines are ethylene and propylene diamine, diethylene and dipropylene triamine, triethylene tetramine, and tetraethylene pentamine. Suitable monocarboxylic acids are those containing from 1 to 18 carbon atoms, or even more, such as acetic, caproic, pelargonic, lauric, palmitic, oleic, and stearic acids; suitable polycarboxylic acids include those having from 3 to 36 carbon atoms, such as adipic, pimelic, suberic, azalaic, sebacic, and dimerized fatty acids. In addition, mixtures of mono- and/or polycarboxylic acids may be used. It is, of course, within the scope of this invention to use polyimidazolines, i.e., compounds having more than one imidazoline ring. These may be prepared by reacting mono- and polycarboxylic acids or mixtures thereof with a polyamine having more than two amino groups, such as triethylene tetramine, or mixtures of polyamines.

The following tabulation illustrates reactants and reaction conditions which may be employed to prepare a representative number of imidazolines and polyimidazolines for use in practicing this invention. This list should not be considered exhaustive of the many combinations of acid and amine which may be used.

| Product | Acid | Moles | Amine | Moles | Reaction Conditions | | |
|---|---|---|---|---|---|---|---|
| | | | | | Pressure mm. Hg | Temp., ° C. | Hours |
| A | Sebacic<br>Oleic | 1<br>1 | Triethylene tetramine | 2 | 760–15 | 150–220 | 4 |
| B | Sebacic<br>Oleic | 5<br>2 | do | 6 | 760–15 | 150–200 | 4 |
| C | Sebacic<br>Oleic | 1<br>2 | do | 2 | 760–15 | 150–220 | 4 |
| D | Acetic | 1 | do | 1 | 760–15 | 150–200 | 4 |
| E | Pelargonic | 1 | Diethylene triamine | 1 | 760–50 | 150–200 | 4 |
| F | Empol 1022* | 1 | do | 2 | 760–50 | 150–200 | 4 |
| G | Oleic<br>Sebacic<br>Empol 1024* | 4<br>3<br>1 | Triethylene Tetramine | 8 | 760–20 | 150–220 | 4 |

*Mixtures of polymerized acids comprising about 75 percent dimeric and 25 percent trimeric acids derived from a mixture of unsaturated 18-carbon monocarboxylic fatty acids.

To improve the flexibility of the plates, the imidazoline may be pre-reacted with an epoxy plasticizer before it is mixed into the composition. The epoxy groups help to control and even enhance crosslinking without degradation. Effective epoxy compounds include epoxidized esters of lower alkyl alcohols and unsaturated fatty acids, and epoxidized triglycerides of vegetable oil fatty acids, such as epoxidized soybean oil and epoxidized castor oil. Reaction of the imidazoline and the epoxy compound proceeds quite readily when carried out at temperatures between about 100° C. and 190° C., and preferably between about 130° C. and 150° C.

A procedure for preparing a typical epoxy-imidazoline reaction product is illustrated in Example IV:

*Example IV*

67.7 pounds (.24 mole) of oleic acid and 36 pounds (.06 mole) of "Empol 1024" were mixed together in a glass vacuum vessel and then 36.4 pounds (.18 mole) of sebacic acid were added. The acids were heated to about 70° C. and then 70.2 pounds (.48 mole) of triethylamine tetramine were added. 0.21 pound of powdered sodium tripolyphosphate was then added to inactivate and chelate any metal impurities which may have been present in the acids and amine. The reactants were vigorously agitated and a nitrogen atmosphere was applied and maintained throughout the reaction period. The mixture was heated initially at one atmosphere to about 150° C. and the temperature was gradually raised until a value of about 220° C. was reached over a three-hour period while the pressure was correspondingly reduced from 760 to 20 mm. Hg. The reaction was then continued for one hour at 220° C. and 20 mm. Hg. Water of condensation was removed throughout the reaction period as formed. The amount of water removed corresponded with about 85 percent conversion of the carboxyls to imidazoline groups, leaving a balance of the carboxyls in the form of amides as confirmed by infrared absorption analysis. The product was then cooled to 130° C. 10 pounds of "Epoxol 7–4" were heated to 130° C. in an open vessel and then 10 pounds of the foregoing acids-amine reaction product (already at a temperature of 130° C.) were added slowly with stirring. ("Epoxol 7–4" is an epoxidized soybean oil having an oxirane oxygen content ranging between about 7.0–7.5 percent). The mixture was stirred gently, held at 130° C. for one hour, and then cooled.

While the halogen-containing polymeric material, the polyesteramine-containing reaction mixture, and the imidazoline product constitute the major ingredients of the printing plate composition, it may be modified by the addition of minor amounts of certain functional constituents. Among these is an agent to sequester any stray moisture which may remain in the composition after it is manufactured or which may accidentally reach the composition during storage and use. Such moisture is undesirable because it tends to form bubbles in the molded plate which adversely affect its printing surface. Any material which would form a compound with water at room temperature and which would not decompose at below about 177° C. would be a suitable moisture-sequestering agent provided it could be reduced to a finely divided state so as to obtain good dispersion and its presence would not cause any undesirable side effects. Quicklime, portland cement, and barium oxide have been found satisfactory for this purpose. White Portland cement is preferred since it can be readily dispersed and results in a more homogeneous print plate.

The printing plate compositions may be prepared by charging the requisite amounts of the ingredients to a suitable apparatus and thoroughly mixing the formulation until all ingredients are uniformly dispersed to yield a homogeneous liquid. A preferred order of compounding is to charge the entire amount of polymeric material and moisture-sequestering agent to a vacuum mixer, and then add the imidazoline and the polyesteramine-containing reaction mixture by increments. The incremental additions are continued until the amounts required by the formulation are thoroughly blended with the other components. The high shear which is developed in this procedure constantly pulverizes any lumps that may form and assures maintenance of uniform viscosity during the mixing operation and in the final product. When all ingredients prescribed by the formulation have been so processed, the resulting composition is ready for use in molding plates directly in liquid form, or the liquid composition may be partially processed by heating for a time sufficient only to form a solid sheet with a minimum amount of cure.

The liquid compositions are stable at room temperature but solidify and chemically crosslink at curing temperatures. Because of the thermosetting properties of these compositions, the plates produced therefrom may be removed immediately from the mold while hot without causing distortion. This expedient may be contrasted with the practice now followed in separating the commercially-available plastic plates from the mold. In the latter practice, a prescribed cooling cycle must be observed before the plate can be separated in order to avoid distortion of the images. Further, the plates derived from compositions of this invention do not undergo distortion due to cold flow in subsequent handling, storing and mounting operations. A significant advantage is the non-porosity of the plate surface, which means less ink consumption. In addition, the ordinary ink solvents have less effect on the stability of the plates of this invention than on the rubber plates of commerce which are extensively used in printing on boxes and cartons.

Example V illustrates a composition, compounded according to the foregoing description, and which is suitable for preparing a flexible plate for printing on boxes and cartons. The composition is a thermosettable liquid, stable at room temperature, which when cured gives a plate having a hardness value of about 30–40, Shore A durometer:

*Example V*

| | Parts by weight |
|---|---|
| Polyvinyl chloride, paste grade | 175 |
| Product of Example IV | 200 |
| Product of Example II | 200 |
| White Portland cement | 15 |

PLATE MOLDING

In preparing duplicate printing plates, a type form is first made by any typesetting process in which the lettering and illustrations on the form are set in relief and in mirror reversal of the original. A matrix or mold is then made of the type form by depressing the relief images into a thermosetting material, such as a phenolic impregnated paperboard, at high temperature wherein a cavity is formed bearing incised positive images. The cavity is filled with a molding compound and subjected to pressure between a pair of heated platens to produce the duplicate plate in which the images lie in relief and in mirror reversal. The duplicate plate is used in the printing operation.

In carrying out the plate-making process with a composition such as that of Example V, the matrix is first preheated at about 163° C. for about 3 to 5 minutes. Of course, the preheating period may be reduced by operating at a slightly elevated temperature. The matrix is then laid flat with the cavity side upward and the surface of the cavity is sprayed with a film of a non-volatile fluid, such as a fluid containing a silicone oil. This fluid facilitates subsequent release of the plate from the matrix. The liquid composition is then poured into the warm matrix in amount sufficient to fill the cavities completely and the filled matrix is then preheated for about 4 minutes at about 163° C. Thereafter, a sheet of non-shrinkable fabric having a thickness of about .1000 inch and upward is placed on top of the matrix to provide a backing for the plate. Suitable fabrics include square weave glass fabric, various non-woven cotton materials, and a preferred type is a rosin-sized cotton sheeting sold by Williamson & Co. as "#25 Fabric Shrink Controller." The prime criterion in selecting a suitable material is non-shrinkability during plate processing.

A small layer of the composition is then disposed on top of the fabric and this unit is preheated for about 2 minutes at about 163° C. to allow the composition to flow readily over the fabric backing. If a small plate is being prepared, then this preheating step may be dispensed with. The amount of composition which is poured on the fabric is not critical so long as it, together with the fabric and the height of the printed image, is sufficient to give at least the desired thickness of the plate. Usually, a slight excess is applied to provide a plate which is slightly thicker than required and the excess is subsequently removed by grinding the cured plate. Finally, the unit is inserted between a pair of press platens, which are heated at about 160° C., and the press is closed. Press heating is carried out for about 5 minutes, the press is then opened and the cured printing plate is removed. It is usually ground or buffed to the desired thickness and is then ready for mounting on the press.

The plates are molded in a standard platemaking press which is generally used in preparing matrices and rubber plastic plates. The equipment is essentially comprised of a hydraulic press which is capable of producing platen pressures of about 1000 pounds per square inch and in which the platens can be heated uniformly with steam or electricity to a temperature of at least about 145° C. In the molding operation, the pressure of the platens on the assembled matrix is regulated by bearers disposed on opposed sides of the matrix. These bearers consist simply of strips of metal, the thickness of which corresponds to the thickness of the assembled matrix. When the press is closed, the pressure of the platens is exerted principally on the bearers and the amount of pressure which is applied to the assembled matrix is governed by the corresponding thickness of the bearers. Accordingly, deformation of the matrix is avoided by the use of such bearers.

The compositions of this invention are stable liquids having excellent castability and ability to print faithful reproductions. Because of its flexible character, the same plate is convertible from rotary to flat bed presses without distorting the printed image. In addition, the plates are endowed with controlled shrinkage, long life, good solvent resistance, low ink absorption and good ink transfer. And while the invention has been described with specific use of the compositions in preparing a particular type of printing plate, the compositions are amenable to other uses where the firm and resilient characteristics of the cured flexible polymer are desirable.

The proportions of the components may be varied over wide limits. The halogen-containing polymeric material may constitute about 20–60 percent, preferably 30–45 percent; the moisture-sequestering agent may be between 1–5 percent, preferably 2–4 percent; the polyesteramine-containing reaction mixture may be present in amounts of 25–50 percent, preferably 30–40 percent; and the imidazoline, when used alone or when prereacted with an epoxy compound, may be present in amounts of 10–40 percent, preferably 20–30 percent. All proportions are based on the total weight of the composition.

We claim:

1. A liquid thermosettable composition comprising a halogen-containing polymer selected from the group consisting of polyvinyl chloride and vinyl chloride copolymerized with another polymerizable monomer, an imidazoline derived by reacting a polyamine and a carboxylic acid containing 1 to 36 carbon atoms at a temperature ranging between 150° C. and 240° C., and a polyesteramine-containing reaction mixture, said reaction mixture being derived by (a) condensing 0.75 mole to one mole of a glycol and one mole of an aliphatic dicarboxylic acid while continuously removing the water of condensation therefrom, halting the reaction when less than all of the carboxylic groups are consumed, then (b) contacting the resulting mixture under reactive conditions with an amout of an amine sufficient to react completely with the residual carboxylic groups in said mixture while continuously removing the water of reaction therefrom, said amine having the formula $$\begin{array}{c} R^2 \\ | \\ R—N—R^2—X \end{array}$$

wherein R and R′ are lower alkyl groups, $R^2$ is a lower alkylene group, and X is a member selected from the group consisting of —OH, —$NH_2$, and —$NHR^3$, where $R^3$ is an alkyl group.

2. A composition according to claim 1 which is supplemented by the addition of a moisture-sequestering agent which is not decomposable at temperatures below about 177° C.

3. A composition according to claim 1 wherein the imidazoline is first prereacted with an epoxy compound before it is incorporated into the composition, said epoxy compound being selected from the group consisting of epoxidized esters of lower alkyl alcohols and unsaturated fatty acids and epoxidized triglycerides of vegetable oil fatty acids.

4. A method for preparing flexible printing plates which comprises pouring the composition of claim 1 into a cavernous, image-bearing mold in amount sufficient to at least fill the cavity thereof, preheating the filled mold, and heat-pressing the preheated mold for a period of time sufficient to cure said composition.

5. A printing plate derived by the method of claim 4.

6. A liquid thermosettable composition comprising a halogen-containing polymer selected from the group consisting of polyvinyl chloride and vinyl chloride copolymerized with another polymerizable monomer, an imidazoline derived by reacting a polyamine and a carboxylic acid containing 1 to 36 carbon atoms at a temperature ranging between 150° C. and 240° C., and a polyesteramine-containing reaction mixture, said reaction mixture being derived by (a) contacting under reactive conditions 0.75 to one mole of a glycol containing 2 to 10 carbon atoms and one mole of an aliphatic dicarboxylic acid containing 3 to 10 carbon atoms and halting the reaction when between about 70 percent to 90 percent of the carboxylic groups are consumed, then (b) contacting the resulting mixture under reactive conditions with an amount of an amine sufficient to react substantially completely with the residual carboxylic groups while continuously removing the water of reaction therefrom, said amine having the formula $$\begin{array}{c} R' \\ | \\ R—N—R^2—X \end{array}$$

wherein R and R′ are lower alkyl groups, $R^2$ is a lower alkylene group, and X is a member selected from the group consisting of —OH, —$NH_2$, and —$NHR^3$ where $R^3$ is an alkyl group.

7. A composition comprising 30–45 percent of a halogen-containing polymer selected from the group consisting of polyvinyl chloride and vinyl chloride copolymerized with another polymerizable monomer, 20–30 percent of an imidazoline derived by reacting a polyamine and a carboxylic acid containing 1 to 36 carbon atoms at a temperature ranging between 150° C. and 240° C., and 30–40 percent of a polyesteramine-containing reaction mixture derived by the reaction described in claim 1.

8. A liquid thermosettable composition comprising 30–45 percent of polyvinyl chloride, 20–30 percent of an imidazoline derived by reacting a polyamine and a carboxylic acid containing 1 to 36 carbon atoms at a temperature ranging between 150° C. and 240° C., and 30–40 percent of a polyesteramine-containing reaction mixture derived by (a) contacting equimolar amounts of azelaic acid and diethylene glycol under reactive conditions and halting the reaction when between about 86–88 percent of the carboxylic groups are consumed, and then (b) contacting the resulting mixture under reactive conditions with an amount of 3-diethylaminopropylamine sufficient to react with the residual carboxylic groups.

9. A liquid thermosettable composition comprising 30–45 percent of polyvinyl chloride, 20–30 percent of an imidazoline derived by reacting a polyamine and a carboxylic acid containing 1 to 36 carbon atoms at a temperature ranging between 150° C. and 240° C., and 30–40 percent of a polyesteramine-containing reaction mixture derived by (a) contacting under reactive conditions 0.875 mole of 1,2-propanediol per mole of azelaic acid and halting the reaction when the stoichiometric amount of water is removed, and then (b) contacting the resulting mixture under reactive conditions with 0.25 mole of 3-diethylaminoproplyamine.

10. A method for preparing flexible printing plates which comprises pouring the composition of claim 9 into a cavernous, image-bearing mold in amounts sufficient to at least fill the cavity thereof, preheating the filled mold, and heat-pressing the preheated mold for a period of time sufficient to cure said composition.

11. A liquid thermosettable composition comprising 30 percent polyvinyl chloride, 34 percent of an imidazoline-epoxidized soybean reaction product, said imidazoline being derived by reacting a polyamine and a carboxylic acid containing 1 to 36 carbon atoms at a temperature ranging between 150° C. and 240° C., 2 percent of Portland cement, and 34 percent of a polyesteramine-containing reaction mixture derived by (a) contacting equimolar amounts of azelaic acid and diethylene glycol under reactive conditions and halting the reaction when between about 86–88 percent of the carboxylic groups are consumed, and then (b) contacting the resulting mixture under reactive conditions with an amount of 3-diethylaminopropylamine sufficient to react with the residual carboxylic groups.

References Cited by the Examiner

UNITED STATES PATENTS

| | | | |
|---|---|---|---|
| 2,048,778 | 7/1936 | Brubaker et al. | 260—22 |
| 2,476,832 | 7/1949 | Donia | 260—896 |
| 2,555,062 | 5/1951 | Small et al. | 260—75 |
| 2,865,927 | 12/1958 | Cain | 260—309.6 |
| 2,878,233 | 3/1959 | Harrison | 260—18 |
| 2,878,234 | 3/1959 | Peterson | 260—309.6 |
| 3,043,848 | 7/1962 | Hageman | 260—309.6 |

LEON J. BERCOVITZ, *Primary Examiner.*

ALPHONSO D. SULLIVAN, *Examiner.*